United States Patent [19]
Ng et al.

[11] Patent Number: 5,600,761
[45] Date of Patent: *Feb. 4, 1997

[54] RESOLUTION ENHANCEMENT SYSTEM FOR COMBINED BINARY AND GRAY SCALE HALFTONE IMAGES

[75] Inventors: Yee S. Ng, Fairport; Hurjay Yeh; Michael A. Pickup, both of Rochester, all of N.Y.

[73] Assignee: Eastman Kodak Company, Rochester, N.Y.

[*] Notice: The term of this patent shall not extend beyond the expiration date of Pat. No. 5,450,531.

[21] Appl. No.: 475,447

[22] Filed: Jun. 7, 1995

Related U.S. Application Data

[63] Continuation of Ser. No. 983,169, Nov. 30, 1992, Pat. No. 5,450,531.
[51] Int. Cl.⁶ ........................................................ G06T 5/00
[52] U.S. Cl. .......................... 395/128; 382/269; 358/456; 358/455; 358/448
[58] Field of Search ...................... 395/128, 132; 358/426, 443, 444, 448, 455–457, 462; 382/232–234, 254, 269, 266

[56] References Cited

U.S. PATENT DOCUMENTS

| | | | |
|---|---|---|---|
| 4,707,647 | 11/1987 | Coldren et al. | 382/151 |
| 4,751,585 | 6/1988 | Shibazaki | 358/464 |
| 4,780,711 | 10/1988 | Doumas | 345/137 |
| 4,817,179 | 3/1989 | Buck | 382/254 |
| 4,908,872 | 3/1990 | Toriu et al. | 382/197 |
| 5,005,139 | 4/1991 | Tung | 395/101 |
| 5,029,108 | 7/1991 | Lung | 395/109 |
| 5,343,309 | 8/1994 | Roetling | 358/455 |

FOREIGN PATENT DOCUMENTS

| | | |
|---|---|---|
| 2015518 | 11/1990 | Canada . |
| 0199502 | 10/1986 | European Pat. Off. . |
| 0234590 | 9/1987 | European Pat. Off. . |

OTHER PUBLICATIONS

*MacUser*, "Image Makers", Henry Bortman, Nov. 1991, pp. 98, 102, 103.
IBM Technical Disclos. Bulletin vol. 28, No. 12, May 1986 pp. 5634–5637 'Fast One Pixel Edge Detector' (see whole document).

*Primary Examiner*—Heather R. Herndon
*Assistant Examiner*—Joseph R. Burwell
*Attorney, Agent, or Firm*—Norman Rushefsky

[57] ABSTRACT

A system for performing edge enhancement of mixed low resolution image files employs a binarization and sorting unit to sort data that is indicative of binary data from the mixed low resolution image input file. The sorted binary data is then supplied to a binary data edge enhancement processor for edge enhancement processing. The output from the binary data edge enhancement processor unit is supplied to a data merger unit along with the original image data. The data merger unit determines whether the original image data was part of a gray-scale image. If the data merger determines the original data is part of a gray-scale image, the original data is supplied as the output of the processing system. If the data merger determines that the original data is binary image data, the output from the binary edge enhancement processor unit is supplied as the output of the processing system.

8 Claims, 29 Drawing Sheets

| | | | | | | | | |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 255 | 255 | 255 | 255 | 255 | 255 | 255 | 255 | 255 |
| 255 | 255 | 255 | 255 | 255 | 255 | 255 | 255 | 255 |
| 255 | 255 | 255 | 0 | 0 | 0 | 0 | 0 | 255 |
| 255 | 255 | 0 | 0 | 0 | 0 | 0 | 0 | 0 |
| 255 | 255 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 255 |
| 0 | 0 | 0 | 0 | 0 | 255 | 255 | 255 | 255 |
| 255 | 255 | 255 | 255 | 255 | 255 | 255 | 255 | 255 |
| 255 | 255 | 255 | 255 | 255 | 255 | 255 | 255 | 0 |
| 0 | 0 | 0 | 255 | 255 | 255 | 255 | 255 | 0 |

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 255 | 255 | 0 | 0 | 0 | 0 | 0 | 0 | 0 | 0 |
| 255 | 255 | 255 | 255 | 0 | 0 | 0 | 0 | 0 | 0 |
| 255 | 255 | 255 | 255 | 255 | 0 | 0 | 0 | 0 | 0 |
| 0 | 255 | 255 | 255 | 255 | 255 | 0 | 0 | 0 | 0 |
| 0 | 255 | 255 | 255 | 255 | 255 | 0 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 255 | 255 | 255 | 255 | 255 | 0 | 0 | 0 | 0 |
| 0 | 255 | 255 | 255 | 255 | 255 | 0 | 0 | 0 | 0 |
| 255 | 255 | 255 | 255 | 255 | 0 | 0 | 0 | 0 | 0 |
| 255 | 255 | 255 | 255 | 0 | 0 | 0 | 0 | 0 | 0 |
| 255 | 255 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 2B

| 0 | 0 | 0 | 255 | 255 | 255 | 255 | 255 | 0 |
|---|---|---|---|---|---|---|---|---|
| 0 | 0 | 0 | 255 | 255 | 255 | 255 | 255 | 255 |
| 0 | 0 | 0 | 0 | 255 | 255 | 255 | 255 | 255 |
| 0 | 0 | 0 | 0 | 255 | 255 | 255 | 255 | 255 |
| 0 | 0 | 0 | 0 | 255 | 255 | 255 | 255 | 255 |
| 0 | 0 | 0 | 0 | 0 | 255 | 255 | 255 | 255 |
| 0 | 0 | 0 | 0 | 0 | 255 | 255 | 255 | 255 |
| 0 | 0 | 0 | 0 | 0 | 0 | 255 | 255 | 255 |
| 0 | 0 | 0 | 0 | 0 | 0 | 255 | 255 | 255 |
| 0 | 0 | 0 | 0 | 0 | 0 | 255 | 255 | 255 |
| 0 | 0 | 0 | 0 | 0 | 0 | 0 | 255 | 255 |
| 0 | 0 | 0 | 0 | 0 | 0 | 0 | 255 | 255 |
| 0 | 0 | 0 | 0 | 0 | 0 | 0 | 255 | 255 |
| 0 | 0 | 0 | 0 | 0 | 0 | 0 | 0 | 255 |
| 0 | 0 | 0 | 0 | 0 | 0 | 0 | 0 | 255 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 2C

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 255 | 0 | 0 | 0 | 0 | 0 | 0 | 0 | 0 | 0 |
| 255 | 0 | 0 | 0 | 0 | 0 | 0 | 0 | 0 | 0 |
| 255 | 0 | 0 | 0 | 0 | 0 | 0 | 0 | 0 | 0 |
| 255 | 255 | 0 | 0 | 0 | 0 | 0 | 0 | 0 | 0 |
| 255 | 255 | 0 | 0 | 0 | 0 | 0 | 0 | 0 | 0 |
| 255 | 255 | 255 | 0 | 0 | 0 | 0 | 0 | 0 | 0 |
| 255 | 255 | 255 | 0 | 0 | 0 | 0 | 0 | 0 | 0 |
| 255 | 255 | 255 | 0 | 0 | 0 | 0 | 0 | 0 | 0 |
| 255 | 255 | 255 | 255 | 0 | 0 | 0 | 0 | 0 | 0 |
| 255 | 255 | 255 | 255 | 255 | 0 | 0 | 0 | 0 | 0 |
| 255 | 255 | 255 | 255 | 255 | 255 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 2D

|     |     |     |     |     |     |     |     |     |
| --- | --- | --- | --- | --- | --- | --- | --- | --- |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 806 | 1020 | 1020 | 1020 | 1020 | 1020 | 1020 | 1020 | 1020 |
| 1062 | 1020 | 1020 | 1020 | 1020 | 1020 | 1020 | 1020 | 1020 |
| 1020 | 0 | 361 | 806 | 1020 | 1020 | 1020 | 806 | 361 |
| 1020 | 361 | 1062 | 1140 | 1020 | 1020 | 1020 | 1140 | 1140 |
| 1020 | 806 | 1140 | 361 | 0 | 0 | 0 | 361 | 806 |
| 806 | 1140 | 806 | 0 | 0 | 0 | 0 | 0 | 0 |
| 361 | 1140 | 361 | 0 | 0 | 0 | 0 | 0 | 0 |
| 0 | 1020 | 0 | 0 | 0 | 0 | 0 | 0 | 0 |
| 0 | 1020 | 0 | 0 | 0 | 0 | 0 | 0 | 0 |
| 510 | 806 | 0 | 0 | 0 | 0 | 0 | 0 | 0 |
| 510 | 361 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 361 |
| 0 | 0 | 0 | 0 | 0 | 0 | 0 | 361 | 1062 |
| 0 | 0 | 0 | 0 | 361 | 806 | 1020 | 1140 | 1062 |
| 806 | 1020 | 1020 | 1020 | 1140 | 1140 | 1020 | 806 | 0 |
| 1062 | 1020 | 1020 | 1020 | 806 | 361 | 0 | 361 | 1062 |
| 1062 | 1020 | 806 | 361 | 0 | 0 | 0 | 806 | 1140 |
| 806 | 1020 | 1062 | 806 | 0 | 0 | 0 | 1020 | 1020 |

FIG. 3A

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1020 | 806 | 361 | 0 | 0 | 0 | 0 | 0 | 0 | 0 |
| 1020 | 1140 | 1140 | 806 | 361 | 0 | 0 | 0 | 0 | 0 |
| 0 | 361 | 806 | 1140 | 1062 | 361 | 0 | 0 | 0 | 0 |
| 806 | 361 | 0 | 361 | 1062 | 1062 | 361 | 0 | 0 | 0 |
| 1020 | 806 | 0 | 0 | 361 | 1140 | 806 | 0 | 0 | 0 |
| 806 | 1140 | 361 | 0 | 0 | 806 | 1140 | 361 | 0 | 0 |
| 361 | 1140 | 806 | 0 | 0 | 361 | 1140 | 806 | 0 | 0 |
| 0 | 1020 | 1020 | 0 | 0 | 0 | 1020 | 1020 | 0 | 0 |
| 0 | 1020 | 1020 | 0 | 0 | 0 | 1020 | 1020 | 0 | 0 |
| 0 | 1020 | 1020 | 0 | 0 | 0 | 1020 | 1020 | 0 | 0 |
| 361 | 1140 | 806 | 0 | 0 | 361 | 1140 | 806 | 0 | 0 |
| 806 | 1140 | 361 | 0 | 0 | 806 | 1140 | 361 | 0 | 0 |
| 1140 | 806 | 0 | 0 | 361 | 1140 | 806 | 0 | 0 | 0 |
| 1062 | 361 | 0 | 361 | 1062 | 1062 | 361 | 0 | 0 | 0 |
| 361 | 361 | 806 | 1140 | 1062 | 361 | 0 | 0 | 0 | 0 |
| 806 | 1140 | 1140 | 806 | 361 | 0 | 0 | 0 | 0 | 0 |
| 1140 | 806 | 361 | 0 | 0 | 0 | 0 | 0 | 0 | 0 |
| 361 | 0 | 0 | 0 | 0 | 0 | 0 | 0 | 0 | 0 |
| 0 | 0 | 0 | 0 | 0 | 0 | 0 | 0 | 0 | 0 |

FIG. 3B

| 0 | 0 | 1020 | 1020 | 0 | 0 | 0 | 806 | 1140 |
|---|---|------|------|---|---|---|-----|------|
| 0 | 0 | 806  | 1140 | 361 | 0 | 0 | 361 | 1140 |
| 0 | 0 | 361  | 1140 | 806 | 0 | 0 | 0 | 1020 |
| 0 | 0 | 0 | 1020 | 1020 | 0 | 0 | 0 | 806 |
| 0 | 0 | 0 | 806 | 1140 | 361 | 0 | 0 | 361 |
| 0 | 0 | 0 | 361 | 1140 | 806 | 0 | 0 | 0 |
| 0 | 0 | 0 | 0 | 806 | 1140 | 361 | 0 | 0 |
| 0 | 0 | 0 | 0 | 361 | 1140 | 806 | 0 | 0 |
| 0 | 0 | 0 | 0 | 0 | 1020 | 1020 | 0 | 0 |
| 0 | 0 | 0 | 0 | 0 | 806 | 1140 | 361 | 0 |
| 0 | 0 | 0 | 0 | 0 | 361 | 1140 | 806 | 0 |
| 0 | 0 | 0 | 0 | 0 | 0 | 1020 | 1020 | 0 |
| 0 | 0 | 0 | 0 | 0 | 0 | 806 | 1140 | 361 |
| 0 | 0 | 0 | 0 | 0 | 0 | 361 | 1140 | 806 |
| 0 | 0 | 0 | 0 | 0 | 0 | 0 | 806 | 1020 |
| 0 | 0 | 0 | 0 | 0 | 0 | 0 | 361 | 806 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 3C

| 361 | 0 | 0 | 0 | 0 | 0 | 0 | 0 | 0 | 0 |
|---|---|---|---|---|---|---|---|---|---|
| 806 | 0 | 0 | 0 | 0 | 0 | 0 | 0 | 0 | 0 |
| 1020 | 0 | 0 | 0 | 0 | 0 | 0 | 0 | 0 | 0 |
| 1140 | 361 | 0 | 0 | 0 | 0 | 0 | 0 | 0 | 0 |
| 1140 | 806 | 0 | 0 | 0 | 0 | 0 | 0 | 0 | 0 |
| 1020 | 1020 | 0 | 0 | 0 | 0 | 0 | 0 | 0 | 0 |
| 806 | 1140 | 361 | 0 | 0 | 0 | 0 | 0 | 0 | 0 |
| 361 | 1140 | 806 | 0 | 0 | 0 | 0 | 0 | 0 | 0 |
| 0 | 806 | 1140 | 361 | 0 | 0 | 0 | 0 | 0 | 0 |
| 0 | 361 | 1140 | 806 | 0 | 0 | 0 | 0 | 0 | 0 |
| 0 | 0 | 1020 | 1020 | 0 | 0 | 0 | 0 | 0 | 0 |
| 0 | 0 | 806 | 1140 | 361 | 0 | 0 | 0 | 0 | 0 |
| 0 | 0 | 361 | 1062 | 1062 | 361 | 0 | 0 | 0 | 0 |
| 0 | 0 | 0 | 361 | 1062 | 1062 | 361 | 0 | 0 | 0 |
| 1020 | 1020 | 1020 | 1020 | 806 | 806 | 510 | 0 | 0 | 0 |
| 1020 | 1020 | 1020 | 1020 | 1020 | 806 | 361 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 3D

|     |     |     |     |     |     |     |     |     |
|-----|-----|-----|-----|-----|-----|-----|-----|-----|
| 0   | 0   | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 252 | 270 | 270 | 270 | 270 | 270 | 270 | 270 | 270 |
| 225 | 270 | 270 | 270 | 270 | 270 | 270 | 270 | 270 |
| 180 | 0   | 45  | 72  | 90  | 90  | 90  | 106 | 135 |
| 180 | 45  | 45  | 63  | 90  | 90  | 90  | 117 | 117 |
| 180 | 18  | 27  | 45  | 0   | 0   | 0   | 135 | 106 |
| 162 | 27  | 18  | 0   | 0   | 0   | 0   | 0   | 0   |
| 135 | 27  | 45  | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 0   |
| 90  | 18  | 0   | 0   | 0   | 0   | 0   | 0   | 0   |
| 90  | 45  | 0   | 0   | 0   | 0   | 0   | 0   | 0   |
| 0   | 0   | 0   | 0   | 0   | 0   | 0   | 0   | 0   |
| 0   | 0   | 0   | 0   | 0   | 0   | 0   | 0   | 225 |
| 0   | 0   | 0   | 0   | 0   | 0   | 0   | 225 | 225 |
| 0   | 0   | 0   | 0   | 225 | 252 | 270 | 243 | 225 |
| 252 | 270 | 270 | 270 | 243 | 243 | 270 | 252 | 0   |
| 225 | 270 | 270 | 270 | 252 | 225 | 0   | 45  | 45  |
| 135 | 90  | 106 | 135 | 0   | 0   | 0   | 18  | 27  |
| 106 | 90  | 135 | 162 | 0   | 0   | 0   | 0   | 0   |

FIG. 4A

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 270 | 265 | 315 | 0 | 0 | 0 | 0 | 0 | 0 | 0 |
| 270 | 297 | 297 | 268 | 315 | 0 | 0 | 0 | 0 | 0 |
| 0 | 316 | 266 | 297 | 315 | 315 | 0 | 0 | 0 | 0 |
| 106 | 135 | 0 | 315 | 315 | 315 | 315 | 0 | 0 | 0 |
| 136 | 162 | 0 | 0 | 315 | 333 | 342 | 0 | 0 | 0 |
| 162 | 153 | 135 | 0 | 0 | 342 | 333 | 315 | 0 | 0 |
| 135 | 153 | 162 | 0 | 0 | 315 | 333 | 342 | 0 | 0 |
| 0 | 180 | 180 | 0 | 0 | 0 | 0 | 0 | 0 | 0 |
| 0 | 180 | 180 | 0 | 0 | 0 | 0 | 0 | 0 | 0 |
| 0 | 180 | 180 | 0 | 0 | 0 | 0 | 0 | 0 | 0 |
| 225 | 207 | 196 | 0 | 0 | 45 | 27 | 16 | 0 | 0 |
| 196 | 207 | 225 | 0 | 0 | 16 | 27 | 45 | 0 | 0 |
| 207 | 196 | 0 | 0 | 45 | 27 | 16 | 0 | 0 | 0 |
| 225 | 225 | 0 | 45 | 45 | 45 | 45 | 0 | 0 | 0 |
| 225 | 45 | 72 | 63 | 45 | 45 | 0 | 0 | 0 | 0 |
| 72 | 63 | 63 | 72 | 45 | 0 | 0 | 0 | 0 | 0 |
| 63 | 72 | 45 | 0 | 0 | 0 | 0 | 0 | 0 | 0 |
| 45 | 0 | 0 | 0 | 0 | 0 | 0 | 0 | 0 | 0 |
| 0 | 0 | 0 | 0 | 0 | 0 | 0 | 0 | 0 | 0 |

FIG. 4B

| | | | | | | | | |
|---|---|---|---|---|---|---|---|---|
| 0 | 0 | 180 | 180 | 0 | 0 | 0 | 342 | 333 |
| 0 | 0 | 162 | 153 | 135 | 0 | 0 | 315 | 333 |
| 0 | 0 | 135 | 153 | 162 | 0 | 0 | 0 | 0 |
| 0 | 0 | 0 | 180 | 180 | 0 | 0 | 0 | 342 |
| 0 | 0 | 0 | 162 | 153 | 135 | 0 | 0 | 315 |
| 0 | 0 | 0 | 135 | 153 | 162 | 0 | 0 | 0 |
| 0 | 0 | 0 | 0 | 162 | 153 | 135 | 0 | 0 |
| 0 | 0 | 0 | 0 | 135 | 153 | 162 | 0 | 0 |
| 0 | 0 | 0 | 0 | 0 | 180 | 180 | 0 | 0 |
| 0 | 0 | 0 | 0 | 0 | 162 | 153 | 135 | 0 |
| 0 | 0 | 0 | 0 | 0 | 135 | 153 | 162 | 0 |
| 0 | 0 | 0 | 0 | 0 | 0 | 180 | 180 | 0 |
| 0 | 0 | 0 | 0 | 0 | 0 | 162 | 153 | 135 |
| 0 | 0 | 0 | 0 | 0 | 0 | 135 | 153 | 162 |
| 0 | 0 | 0 | 0 | 0 | 0 | 0 | 162 | 135 |
| 0 | 0 | 0 | 0 | 0 | 0 | 0 | 135 | 106 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 4C

| 315 | 0 | 0 | 0 | 0 | 0 | 0 | 0 | 0 | 0 |
|-----|-----|-----|-----|-----|-----|-----|---|---|---|
| 342 | 0 | 0 | 0 | 0 | 0 | 0 | 0 | 0 | 0 |
| 0 | 0 | 0 | 0 | 0 | 0 | 0 | 0 | 0 | 0 |
| 333 | 315 | 0 | 0 | 0 | 0 | 0 | 0 | 0 | 0 |
| 333 | 342 | 0 | 0 | 0 | 0 | 0 | 0 | 0 | 0 |
| 0 | 0 | 0 | 0 | 0 | 0 | 0 | 0 | 0 | 0 |
| 342 | 333 | 315 | 0 | 0 | 0 | 0 | 0 | 0 | 0 |
| 315 | 333 | 342 | 0 | 0 | 0 | 0 | 0 | 0 | 0 |
| 0 | 342 | 333 | 315 | 0 | 0 | 0 | 0 | 0 | 0 |
| 0 | 315 | 333 | 342 | 0 | 0 | 0 | 0 | 0 | 0 |
| 0 | 0 | 0 | 0 | 0 | 0 | 0 | 0 | 0 | 0 |
| 0 | 0 | 342 | 333 | 315 | 0 | 0 | 0 | 0 | 0 |
| 0 | 0 | 315 | 315 | 315 | 315 | 0 | 0 | 0 | 0 |
| 0 | 0 | 0 | 315 | 315 | 315 | 315 | 0 | 0 | 0 |
| 90 | 90 | 90 | 90 | 72 | 16 | 0 | 0 | 0 | 0 |
| 90 | 90 | 90 | 90 | 90 | 72 | 45 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 4D

| 0 | 0 | 0 | 15 | 15 | 15 | 15 | 15 |
|---|---|---|----|----|----|----|----|
| 0 | 0 | 0 | 15 | 15 | 15 | 15 | 15 |
| 0 | 0 | 0 | 15 | 15 | 15 | 15 | 15 |
| 0 | 0 | 15 | 15 | 15 | 15 | 15 | 0 |
| 0 | 0 | 15 | 15 | 15 | 15 | 15 | 0 |
| 0 | 0 | 15 | 15 | 15 | 15 | (15) | 0 |
| 0 | 0 | 15 | 15 | 15 | 15 | 15 | 0 |
| 0 | 15 | 15 | 15 | 15 | 15 | 0 | 0 |
| 0 | 15 | 15 | 15 | 15 | 15 | 0 | 0 |

FIG. 6

| 0 | 0 | 0 | 0 | 0 |
|---|---|---|---|---|
| 0 | 15 | (15) | 15 | 15 |
| 15 | 15 | 15 | 15 | 15 |

FIG. 9

| 0 | 0 | 1 | 1 | 0 | 0 | 0 | 5 |
|---|---|---|---|---|---|---|---|
| 0 | 0 | 1 | 1 | 0 | 0 | 0 | 5 |
| 0 | 2 | 2 | 1 | 0 | 0 | 6 | 6 |
| 0 | 1 | 2 | 2 | 0 | 0 | 5 | 6 |
| 0 | 1 | 1 | 0 | 0 | 0 | 5 | 5 |
| 0 | 1 | 1 | 0 | 0 | 0 | 5 | 5 |
| 2 | 2 | 1 | 0 | 0 | 6 | 6 | 5 |
| 1 | 2 | 2 | 0 | 0 | 5 | 6 | 6 |
| 1 | 1 | 0 | 0 | 0 | 5 | 5 | 0 |

FIG. 7

| 2 | 3 | 3 | 3 | 2 |
|---|---|---|---|---|
| 2 | 2 | 3 | 3 | 3 |
| 3 | 2 | 0 | 0 | 0 |

FIG. 10

| 0 | 0 | 60 | 60 | 0 | 0 | 0 | 60 |
|---|---|----|----|---|---|---|----|
| 0 | 0 | 60 | 60 | 0 | 0 | 0 | 60 |
| 0 | 21 | 67 | 47 | 0 | 0 | 21 | 67 |
| 0 | 47 | 67 | 21 | 0 | 0 | 47 | 67 |
| 0 | 60 | 60 | 0 | 0 | 0 | 60 | 60 |
| 0 | 60 | 60 | 0 | 0 | 0 | 60 | 60 |
| 21 | 67 | 47 | 0 | 0 | 21 | 67 | 47 |
| 47 | 67 | 21 | 0 | 0 | 47 | 67 | 21 |
| 60 | 60 | 0 | 0 | 0 | 60 | 60 | 0 |

FIG. 8

| 21 | 47 | 60 | 60 | 67 |
|----|----|----|----|----|
| 67 | 67 | 60 | 60 | 47 |
| 47 | 21 | 0 | 0 | 0 |

FIG. 11

|    |    |   |
|----|----|---|
| 15 | 15 | 0 |
| 15 | 15 | 0 |
| 15 | 15 | 0 |
| 15 | 15 | 0 |
| 15 | 0  | 0 |

FIG. 12

|   |   |   |
|---|---|---|
| 0 | 5 | 6 |
| 0 | 5 | 5 |
| 0 | 5 | 5 |
| 6 | 6 | 5 |
| 5 | 6 | 6 |

FIG. 13

|    |    |    |
|----|----|----|
| 0  | 47 | 67 |
| 0  | 60 | 60 |
| 0  | 60 | 60 |
| 21 | 67 | 47 |
| 47 | 67 | 21 |

FIG. 14

|   |    |    |
|---|----|----|
| 0 | 15 | 15 |
| 0 | 15 | 15 |
| 0 | 15 | 15 |
| 0 | 15 | 15 |
| 0 | 0  | 15 |

FIG. 15

|   |   |   |
|---|---|---|
| 6 | 5 | 0 |
| 5 | 5 | 0 |
| 5 | 5 | 0 |
| 5 | 6 | 6 |
| 6 | 6 | 5 |

FIG. 16

|    |    |    |
|----|----|----|
| 67 | 47 | 0  |
| 60 | 60 | 0  |
| 60 | 60 | 0  |
| 47 | 67 | 21 |
| 27 | 67 | 47 |

FIG. 17

|   |    |    |
|---|----|----|
| 0 | 15 | 15 |
| 0 | 15 | 15 |
| 0 | 15 | 15 |
| 0 | 15 | 15 |
| 0 | 0  | 15 |

FIG. 18

|   |   |   |
|---|---|---|
| 2 | 3 | 0 |
| 3 | 3 | 0 |
| 3 | 3 | 0 |
| 3 | 2 | 2 |
| 2 | 2 | 3 |

FIG. 19

|    |    |    |
|----|----|----|
| 67 | 47 | 0  |
| 60 | 60 | 0  |
| 60 | 60 | 0  |
| 47 | 67 | 21 |
| 21 | 67 | 47 |

FIG. 20

|   |    |    |
|---|----|----|
| 0 | 0  | 15 |
| 0 | 15 | 15 |
| 0 | 15 | 15 |
| 0 | 15 | 15 |
| 0 | 15 | 15 |

FIG. 21

|   |   | V41 | V21 | V11 | V31 | V51 |   |   |
|---|---|---|---|---|---|---|---|---|
|   |   |   | V22 | V12 | V32 |   |   |   |
|   |   |   | V23 | V13 | V33 |   |   |   |
|   |   | V44 | V24 | V14 | V34 | V54 |   |   |
|   |   | V45 | V25 | V15 | V35 | V55 |   |   |
|   |   | V46 | V26 | V16 | V36 | V56 |   |   |
|   |   |   | V27 | V17 | V37 |   |   |   |
|   |   |   | V28 | V18 | V38 |   |   |   |
|   |   | V49 | V29 | V19 | V39 | V59 |   |   |

FIG. 22

|   |   |   |   |   |   |   |   |   |
|---|---|---|---|---|---|---|---|---|
|   |   |   |   |   |   |   |   |   |
|   |   |   |   |   |   |   |   |   |
|   |   |   |   | d14 |   |   |   |   |
|   |   |   | d25 | d15 | d35 |   |   |   |
|   |   |   |   | d16 |   |   |   |   |
|   |   |   |   |   |   |   |   |   |
|   |   |   |   |   |   |   |   |   |
|   |   |   |   |   |   |   |   |   |

FIG. 23

|   |   |   |   |   |   |   |   |   |
|---|---|---|---|---|---|---|---|---|
|   |   |   |   |   |   |   |   |   |
|   |   |   |   |   |   |   |   |   |
|   |   |   |   | a14 |   |   |   |   |
|   |   |   |   | a15 |   |   |   |   |
|   |   |   |   | a16 |   |   |   |   |
|   |   |   |   |   |   |   |   |   |
|   |   |   |   |   |   |   |   |   |
|   |   |   |   |   |   |   |   |   |

| | | | | | | | | |
|---|---|---|---|---|---|---|---|---|
| | | | | | | | | |
| V49 | | | V46 | V45 | V44 | | | V41 |
| V29 | V28 | V27 | V26 | V25 | V24 | V23 | V22 | V21 |
| V19 | V18 | V17 | V16 | V15 | V14 | V13 | V12 | V11 |
| V39 | V38 | V37 | V36 | V35 | V34 | V33 | V32 | V31 |
| V59 | | | V56 | V55 | V54 | | | V51 |
| | | | | | | | | |
| | | | | | | | | |

FIG. 28

| | | | | | | | | |
|---|---|---|---|---|---|---|---|---|
| | | | | | | | | |
| | | | | | | | | |
| | | | | | | | | |
| | | | | d25 | | | | |
| | | | d16 | d15 | d14 | | | |
| | | | | d35 | | | | |
| | | | | | | | | |
| | | | | | | | | |
| | | | | | | | | |

FIG. 29

| | | | | | | | | |
|---|---|---|---|---|---|---|---|---|
| | | | | | | | | |
| | | | | | | | | |
| | | | | | | | | |
| | | | | | | | | |
| | | | a16 | a15 | a14 | | | |
| | | | | | | | | |
| | | | | | | | | |
| | | | | | | | | |
| | | | | | | | | |

FIG. 30

|   |   |   |   |   |   |   |   |   |   |
|---|---|---|---|---|---|---|---|---|---|
|   |   | V23 |   |   |   |   |   |   |   |
|   | V33 | V13 | V24 | V44 |   |   |   |   |   |
|   |   | V34 | V14 | V25 | V45 |   |   |   |   |
|   |   | V54 | V35 | V15 | V26 | V46 |   |   |   |
|   |   |   | V55 | V36 | V16 | V27 |   |   |   |
|   |   |   |   | V56 | V37 | V17 |   |   |   |
|   |   |   |   |   |   |   |   |   |   |
|   |   |   |   |   |   |   |   |   |   |

FIG. 31

|   |   |   |   |   |   |   |   |   |   |
|---|---|---|---|---|---|---|---|---|---|
|   |   |   |   |   |   |   |   |   |   |
|   |   |   |   |   |   |   |   |   |   |
|   |   |   |   |   |   |   |   |   |   |
|   |   |   | d14 | d25 |   |   |   |   |   |
|   |   |   | d35 | d15 |   |   |   |   |   |
|   |   |   |   |   | d16 |   |   |   |   |
|   |   |   |   |   |   |   |   |   |   |
|   |   |   |   |   |   |   |   |   |   |
|   |   |   |   |   |   |   |   |   |   |

FIG. 32

|   |   |   |   |   |   |   |   |   |   |
|---|---|---|---|---|---|---|---|---|---|
|   |   |   |   |   |   |   |   |   |   |
|   |   |   |   |   |   |   |   |   |   |
|   |   |   |   |   |   |   |   |   |   |
|   |   |   | a14 |   |   |   |   |   |   |
|   |   |   |   | a15 |   |   |   |   |   |
|   |   |   |   |   | a16 |   |   |   |   |
|   |   |   |   |   |   |   |   |   |   |
|   |   |   |   |   |   |   |   |   |   |
|   |   |   |   |   |   |   |   |   |   |

FIG. 33

|   |   | V51 | V31 | V11 | V21 | V41 |   |   |
|---|---|-----|-----|-----|-----|-----|---|---|
|   |   |     | V32 | V12 | V22 |     |   |   |
|   |   |     | V33 | V13 | V23 |     |   |   |
|   |   | V54 | V34 | V14 | V24 | V44 |   |   |
|   |   | V55 | V35 | V15 | V25 | V45 |   |   |
|   |   | V56 | V36 | V16 | V26 | V46 |   |   |
|   |   |     | V37 | V17 | V27 |     |   |   |
|   |   |     | V38 | V18 | V28 |     |   |   |
|   |   | V59 | V39 | V19 | V29 | V49 |   |   |

FIG. 34

|   |   |   |   |     |     |     |   |   |
|---|---|---|---|-----|-----|-----|---|---|
|   |   |   |   |     |     |     |   |   |
|   |   |   |   |     |     |     |   |   |
|   |   |   |   |     |     |     |   |   |
|   |   |   |   | d14 |     |     |   |   |
|   |   |   |d35| d15 | d25 |     |   |   |
|   |   |   |   | d16 |     |     |   |   |
|   |   |   |   |     |     |     |   |   |
|   |   |   |   |     |     |     |   |   |
|   |   |   |   |     |     |     |   |   |

FIG. 35

|   |   |   |   |     |   |   |   |   |
|---|---|---|---|-----|---|---|---|---|
|   |   |   |   |     |   |   |   |   |
|   |   |   |   |     |   |   |   |   |
|   |   |   |   |     |   |   |   |   |
|   |   |   |   | a14 |   |   |   |   |
|   |   |   |   | a15 |   |   |   |   |
|   |   |   |   | a16 |   |   |   |   |
|   |   |   |   |     |   |   |   |   |
|   |   |   |   |     |   |   |   |   |
|   |   |   |   |     |   |   |   |   |

|     |     |     |     |     |     |     |     |     |
|-----|-----|-----|-----|-----|-----|-----|-----|-----|
|     |     |     |     |     |     |     |     |     |
| V59 |     |     | V56 | V55 | V54 |     |     | V51 |
| V39 | V38 | V37 | V36 | V35 | V34 | V33 | V32 | V31 |
| V19 | V18 | V17 | V16 | V15 | V14 | V13 | V12 | V11 |
| V29 | V28 | V27 | V26 | V25 | V24 | V23 | V22 | V21 |
| V49 |     |     | V46 | V45 | V44 |     |     | V41 |
|     |     |     |     |     |     |     |     |     |
|     |     |     |     |     |     |     |     |     |

FIG. 40

|     |     |     |     |     |     |     |     |     |
|-----|-----|-----|-----|-----|-----|-----|-----|-----|
|     |     |     |     |     |     |     |     |     |
|     |     |     |     |     |     |     |     |     |
|     |     |     |     |     |     |     |     |     |
|     |     |     |     | d35 |     |     |     |     |
|     |     |     | d16 | d15 | d14 |     |     |     |
|     |     |     |     | d25 |     |     |     |     |
|     |     |     |     |     |     |     |     |     |
|     |     |     |     |     |     |     |     |     |
|     |     |     |     |     |     |     |     |     |
|     |     |     |     |     |     |     |     |     |

FIG. 41

|     |     |     |     |     |     |     |     |     |
|-----|-----|-----|-----|-----|-----|-----|-----|-----|
|     |     |     |     |     |     |     |     |     |
|     |     |     |     |     |     |     |     |     |
|     |     |     |     |     |     |     |     |     |
|     |     |     |     |     |     |     |     |     |
|     |     |     | a16 | a15 | a14 |     |     |     |
|     |     |     |     |     |     |     |     |     |
|     |     |     |     |     |     |     |     |     |
|     |     |     |     |     |     |     |     |     |
|     |     |     |     |     |     |     |     |     |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 15 | 15 | 15 | 0 | 0 | 0 | 0 | 0 |
| 0 | 0 | 0 | 15 | 15 | 15 | 15 | 15 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 49

| 0 | 0 | 1 | 0 | 5 | 0 | 0 | 0 |
|---|---|---|---|---|---|---|---|
| 0 | 0 | 1 | 0 | 5 | 0 | 0 | 0 |
| 0 | 0 | 1 | 0 | 5 | 0 | 0 | 0 |
| 0 | 0 | 1 | 0 | 5 | 0 | 0 | 0 |
| 0 | 2 | 1 | 0 | 5 | 0 | 0 | 0 |
| 0 | 1 | 2 | 5 | 6 | 0 | 0 | 0 |
| 0 | 1 | 0 | 5 | 0 | 0 | 0 | 0 |
| 0 | 1 | 0 | 5 | 0 | 0 | 0 | 0 |
| 0 | 1 | 0 | 5 | 0 | 0 | 0 | 0 |

FIG. 47

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 3 | 3 | 3 | 4 | 0 | 0 | 0 | 0 |
| 0 | 0 | 4 | 3 | 3 | 3 | 3 | 3 |
| 7 | 7 | 7 | 8 | 0 | 0 | 0 | 0 |
| 0 | 0 | 8 | 7 | 7 | 7 | 7 | 7 |
| 0 | 0 | 0 | 0 | 0 | 0 | 0 | 0 |
| 0 | 0 | 0 | 0 | 0 | 0 | 0 | 0 |

FIG. 50

| 15 | 15 | 7 |
|----|----|---|
| 15 | 15 | 5 |
| 15 | 11 | 0 |
| 15 | 9 | 0 |
| 15 | 7 | 0 |

FIG. 48

| 0 | 0 | 0 | 15 | 0 | 0 | 0 | 0 |
|---|---|---|----|---|---|---|---|
| 0 | 0 | 0 | 15 | 0 | 0 | 0 | 0 |
| 0 | 0 | 0 | 15 | 0 | 0 | 0 | 0 |
| 0 | 0 | 0 | 15 | 0 | 0 | 0 | 0 |
| 0 | 0 | 0 | 15 | 0 | 0 | 0 | 0 |
| 0 | 0 | 15 | 0 | 0 | 0 | 0 | 0 |
| 0 | 0 | 15 | 0 | 0 | 0 | 0 | 0 |
| 0 | 0 | 15 | 0 | 0 | 0 | 0 | 0 |
| 0 | 0 | 15 | 0 | 0 | 0 | 0 | 0 |

|    |    |    |
|----|----|----|
| 13 | 14 | 13 |
| 14 | 15 | 14 |
| 13 | 14 | 13 |

FIG. 52

|   |    |   |
|---|----|---|
| 0 | 0  | 0 |
| 0 | 15 | 0 |
| 0 | 0  | 0 |

FIG. 53

|   |    |    |
|---|----|----|
| 0 | 0  | 15 |
| 0 | 15 | 15 |
| 0 | 15 | 15 |

FIG. 54

| 0 | 0 | 0  | 15 | 0 | 0 | 0 | 0 |
|---|---|----|----|---|---|---|---|
| 0 | 0 | 0  | 15 | 0 | 0 | 0 | 0 |
| 0 | 0 | 0  | 15 | 0 | 0 | 0 | 0 |
| 0 | 0 | 0  | 15 | 0 | 0 | 0 | 0 |
| 0 | 0 | 15 | 15 | 0 | 0 | 0 | 0 |
| 0 | 0 | 15 | 0  | 0 | 0 | 0 | 0 |
| 0 | 0 | 15 | 0  | 0 | 0 | 0 | 0 |
| 0 | 0 | 15 | 0  | 0 | 0 | 0 | 0 |
| 0 | 0 | 15 | 0  | 0 | 0 | 0 | 0 |

FIG. 55

RESOLUTION ENHANCEMENT SYSTEM FOR COMBINED BINARY AND GRAY SCALE HALFTONE IMAGES

CROSS-REFERENCE TO RELATED APPLICATION.

This application is related to U.S. application Ser. No. 07/983,155, filed on Nov. 30, 1992 in the name of Ycc S. Ng and entitled "Resolution Enhancement System for Binary Images", now U.S. Pat. No. 5,502,793. This is a continuation of application Ser. No. U.S. 07/983,169, now U.S. Pat. No. 5,450,531 filed 30 Nov. 1992.

FIELD OF THE INVENTION

The invention relates generally to digital image processing and, more specifically, to a digital image processing system for enhancing the edge characteristics of printed images that are generated from low resolution image files containing a mixture of binary and gray-scale data.

BACKGROUND

Edge or line jaggedness is a common problem associated with the printing of low resolution image data. Several methods of processing low resolution image data have been devised in attempts to overcome the line jaggedness problem. For example, in the case of images created from low resolution binary image data, template matching methods of the type described in U.S. Pat. No. 5,005,139 or outline extraction methods of the type described in the article entitled "Image Makers", by Henry Bortman, MacUser, Nov. 1991, pp. 98–103 have been used to reduce line jaggedness. Both of the above-referenced methods use a low resolution bitmap as an input file and both methods perform digital processing operations on the low resolution bitmap to produce an enhanced image output file. The enhanced output file is supplied to the printhead of a printer to produce a hardcopy of the image.

There are disadvantages, however, to both of the template matching and outline extraction methods of edge enhancement discussed above. In the template matching method, the number of templates that can be employed must be limited in order to maintain acceptable processing speeds. If a pattern within the bitmap data contained in the input file does not happen to match one of the available templates, an edge resolution enhancement operation cannot be performed, regardless of the quality of the image that will be produced from the input data. In the outline extraction method, variable dot sizes are used to "fill in" and match a character's outline. The fill in process, however, can be difficult when small fonts are employed. The outline extraction method also tends to broaden thin graph lines that are spaced close together, which results in the merger of multiple lines and a perceivable reduction in the resolution of the printed image.

Another drawback to the above-described processes is that they tend to have a negative impact on gray-scale halftone data. Thus, the processes are not particularly well suited for processing mixed image data files containing both binary image data and gray scale halftone image data. Mixed data files, however, are becoming more and more common. Many imaging systems, for example, now combine text data with gray-scale halftoned image data and binary graphic data in a single image.

In view of the above, it is an object of the invention to provide a system for providing edge enhancement of mixed image files containing both binary image data and gray-scale image data without suffering the resolution degradation associated with the outline extraction method and the drawbacks of the template matching method outlined above.

SUMMARY OF THE INVENTION

The invention provides a system for performing edge enhancement of mixed low resolution image files that is flexible and adaptable to high speed processing operations without causing a degradation in image resolution. The system employs a binarization and sorting unit to sort data that is indicative of binary data from the mixed low resolution image input file. The sorted binary data is then supplied to a binary data edge enhancement processor for edge enhancement processing. The output from the binary data edge enhancement processor unit is supplied to a data merger unit along with the original image data. The data merger unit determines whether the original image data included gray-scale image data. If the data merger determines the original data does include gray-scale image data, the original data is supplied as the output of the processing system. If the data merger determines that the original data is binary image data, the output from the binary edge enhancement processor unit is supplied as the output of the processing system.

BRIEF DESCRIPTION OF THE DRAWINGS

With the above as background, reference should now be made to the following description of the best mode for carrying out the invention and the accompanying drawings, wherein:

FIGS. 2A–2D form an example of binary bitmap data applied to the input of the binary data edge enhancement processor shown in FIG. 1;

FIGS. 3A–3D form a gradient magnitude map of the binary bitmap data shown in FIGS. 2A–2D;

FIGS. 4A–4D form gradient angle map of the binary bitmap data shown in FIGS. 2A–2D;

FIG. 6 illustrates a 9×9 window of binary data for a near vertical line;

FIG. 7 illustrates the gradient directions corresponding to each pixel location of the window shown in FIG. 6;

FIG. 8 illustrates the gradient magnitudes corresponding to each pixel location of the window shown in FIG. 6

FIG. 9 illustrates a 3×5 window of binary data for a near horizontal line;

FIG. 10 illustrates the gradient directions corresponding to each pixel location of the window shown in FIG. 9;

FIG. 11 illustrates the gradient magnitudes corresponding to each pixel location of the window shown in FIG. 9;

FIGS. 12–14 respectively illustrate pixel values, gradient directions and gradient magnitudes for a 3×5 window of pixels surrounding a kink site located in the 9×9 window of FIG. 6;

FIGS. 15–17 respectively illustrate the pixel values, gradient directions and gradient magnitudes shown in FIGS. 12–14 rotated to a preferred orientation;

FIGS. 18–20 respectively illustrate the pixel values, gradient directions and gradient magnitudes shown in FIGS. 9–11 rotated to a preferred orientation;

FIG. 21 illustrates a template that is utilized to identify a kink site;

FIGS. 22–24 respectively illustrate the pixel value, gradient direction and gradient magnitude maps for a central pixel having a gradient direction of one;

Figures 25, 26, 27:
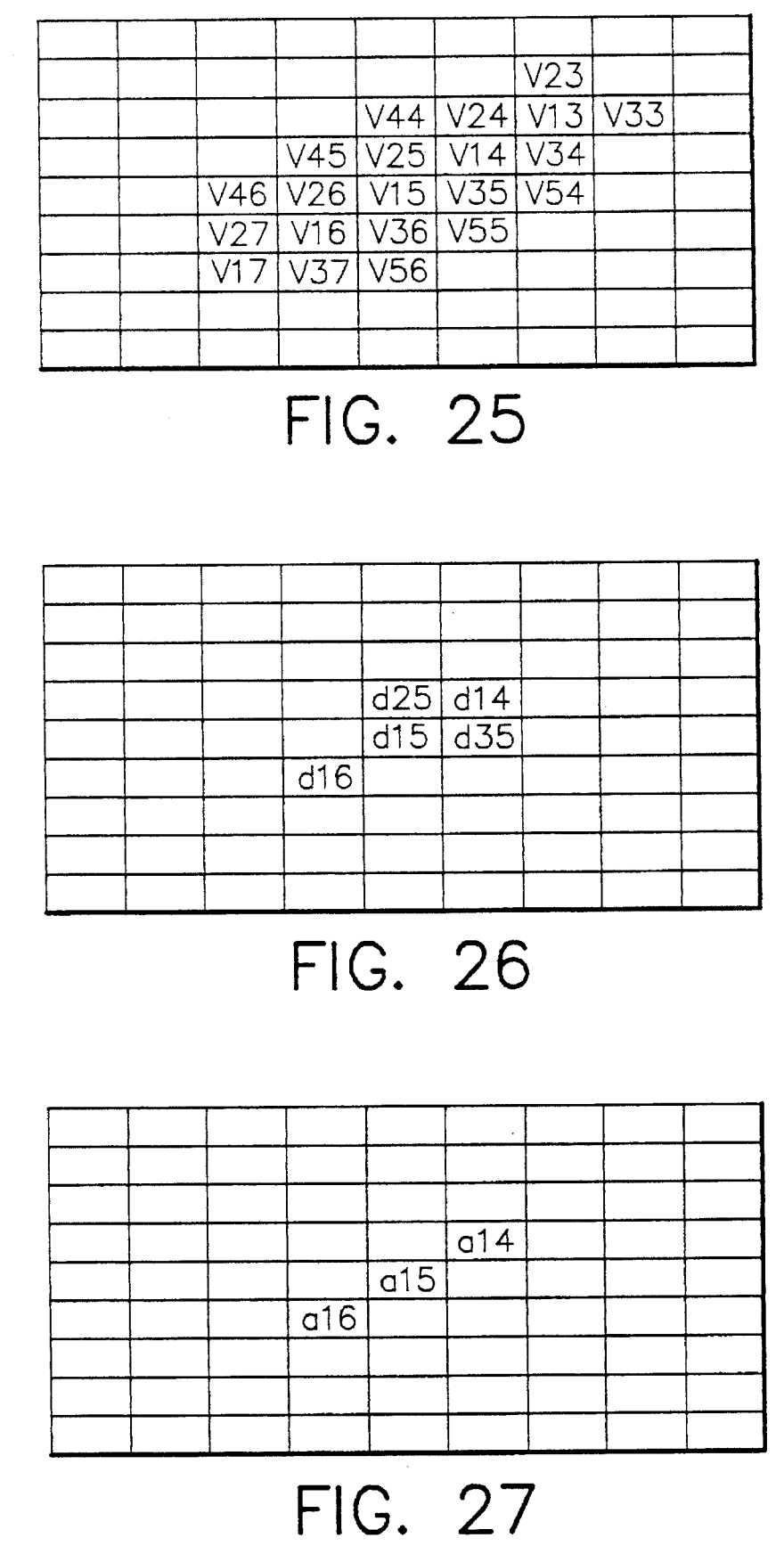

FIGS. 25–27 respectively illustrate the pixel value, gradient direction and gradient magnitude maps for a central pixel having a gradient direction of two;

FIGS. 28–30 respectively illustrate the pixel value, gradient direction and gradient magnitude maps for a central pixel having a gradient direction of three;

FIGS. 31–33 respectively illustrate the pixel value, gradient direction and gradient magnitude maps for a central pixel having a gradient direction of four;

FIGS. 34–36 respectively illustrate the pixel value, gradient direction and gradient magnitude maps for a central pixel having a gradient direction of five;

Figures 37, 38, 39:
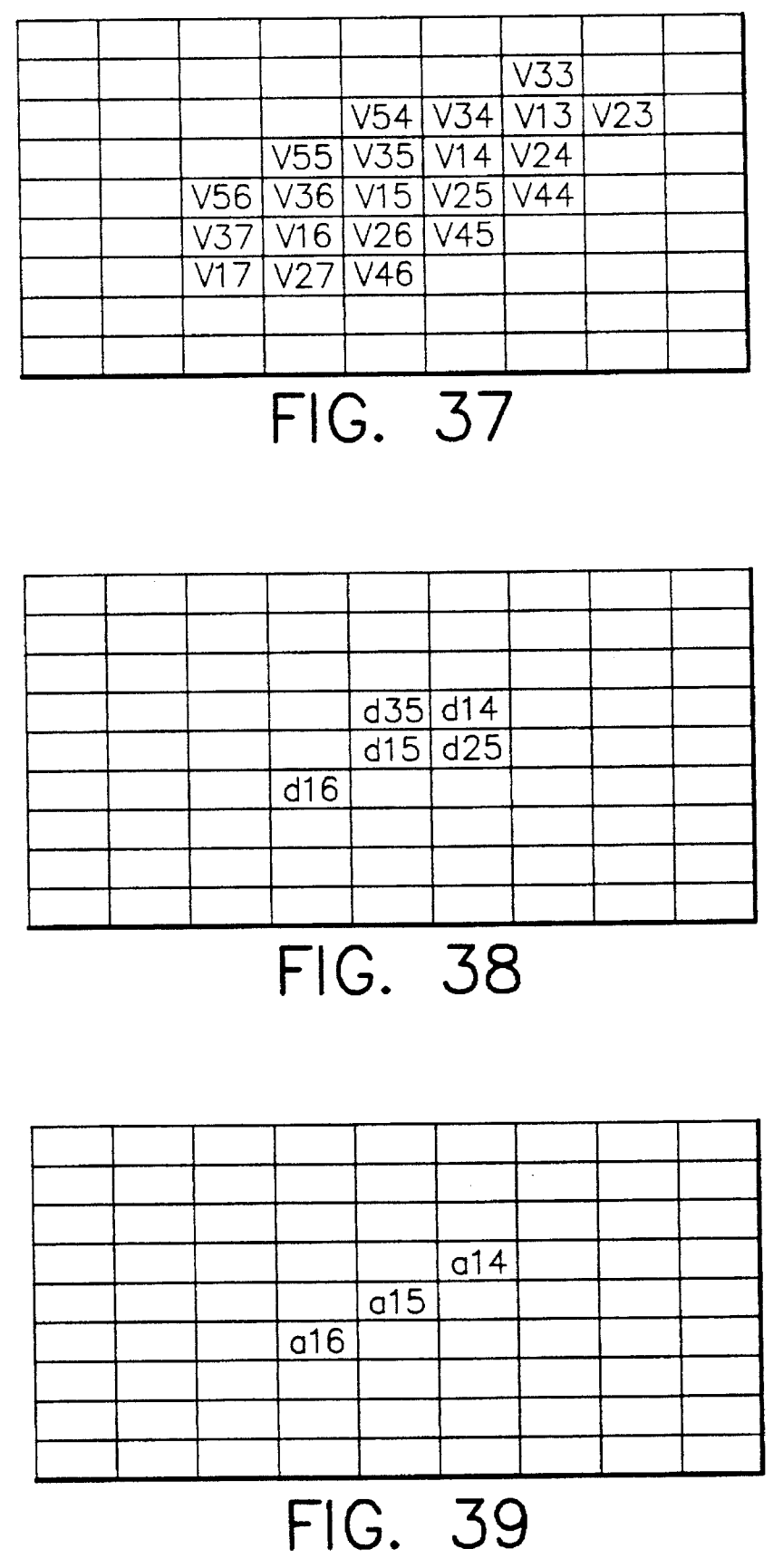

FIGS. 37–39 respectively illustrate the pixel value, gradient direction and gradient magnitude maps for a central pixel having a gradient direction of six;

FIGS. 40–42 respectively illustrate the pixel value, gradient direction and gradient magnitude maps for a central pixel having a gradient direction of seven;

Figures 43, 44, 45:
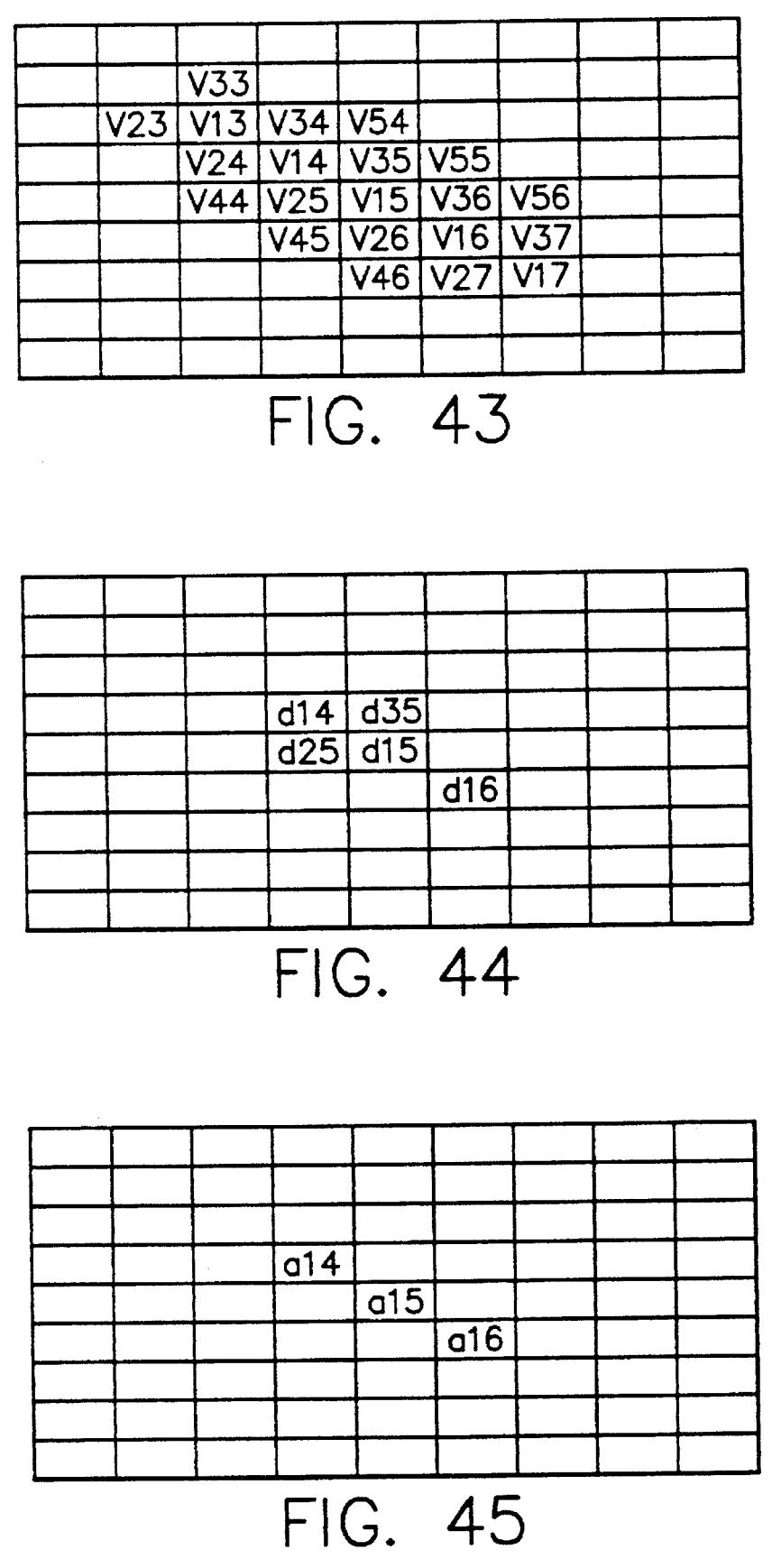

FIGS. 43–45 respectively illustrate the pixel value, gradient direction and gradient magnitude maps for a central pixel having a gradient direction of eight;

FIG. 46 is a window illustrating a one pixel wide horizontal line;

FIG. 47 illustrates the gradient directions corresponding to the pixel locations shown in FIG. 46;

FIG. 48 is a window illustrating a one pixel wide vertical line;

FIG. 49 illustrates the gradient directions corresponding to the pixel locations shown in FIG. 48;

FIG. 50 is an example of enhanced gray-scale output data corresponding to the original binary image data illustrated in FIG. 12;

FIG. 52 is a 3×3 window of original image data containing gray-scale data that is supplied to the binarization and sorting unit shown in FIG. 51;

FIG. 53 is a 3×3 window of sorted image data produced from the binarization and sorting unit shown in FIG. 51 when the mixed image data of FIG. 52 is applied thereto;

FIG. 54 is a 3×3 window of original image data containing binary data that is supplied to the binarization and sorting unit shown in FIG. 51; and FIG. 55 is a 9×9 window illustrating a special case of a single pixel line in which the first pixel of a kink site overlaps an adjacent pixel.

BEST MODE OF CARRYING OUT THE INVENTION

Figure 51:
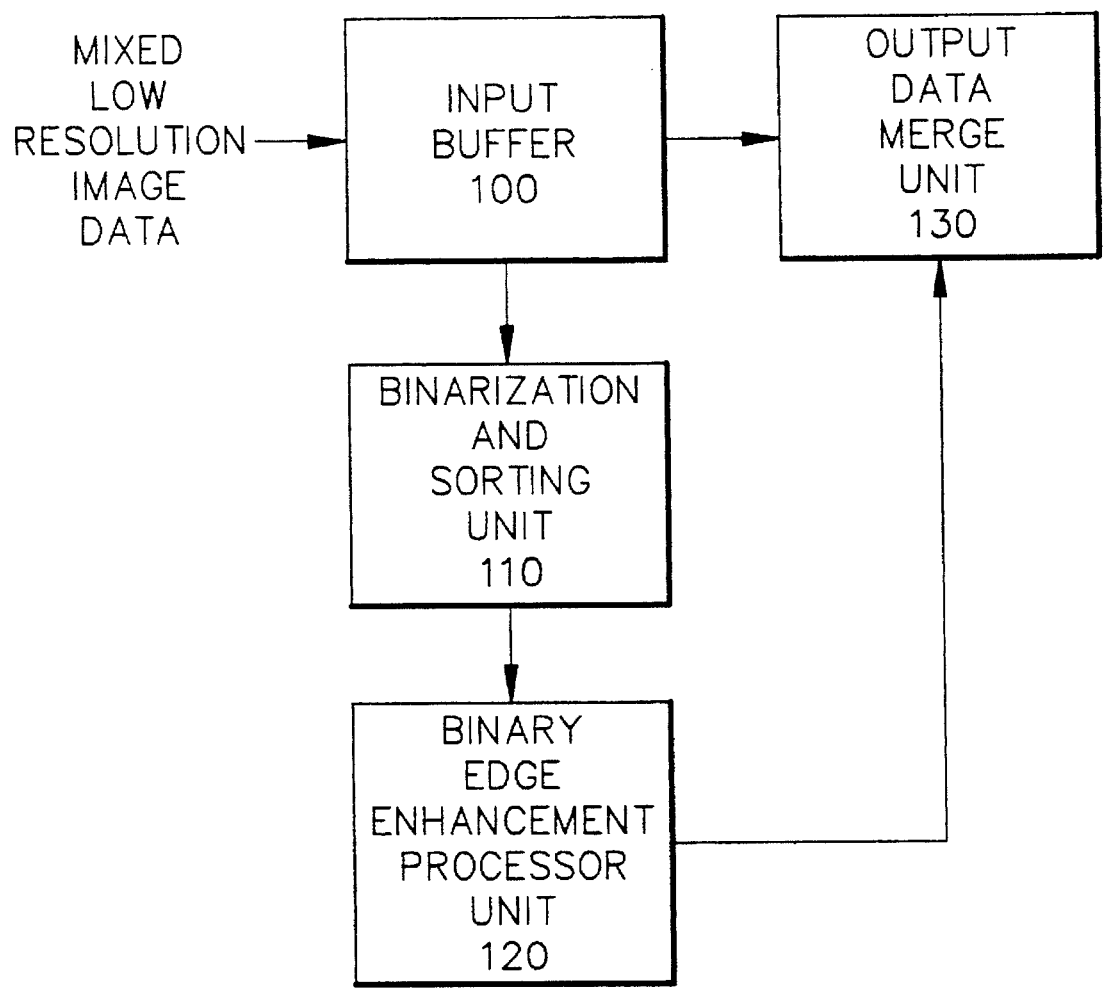
FIG. 51 is a functional block diagram of an edge enhancement processing system in accordance with the present invention.

A functional block diagram of an edge enhancement processing system for processing mixed image data in accordance with the invention is illustrated in FIG. 51. A mixed low resolution image file, in the form of a bitmap having a plurality of pixel locations containing either gray-scale image data or binary image data, is supplied to an input buffer 100. The bitmap is subsequently supplied to a binarization and sorting unit 110, which passes only sorted data that is indicative of binary image data to a binary edge enhancement processor unit 120. The binary edge enhancement processor unit 120 performs edge enhancement processing operations on the sorted data to produce enhanced sorted data that is supplied to an output data merge unit 130. The output merge unit 130 analyzes the original bitmap data supplied to the binarization and sorting unit 110 to determine whether the original bitmap data was gray-scale image data or binary image data. If the original data was gray-scale image data, the output data merger unit 130 supplies the original data from the input buffer 100 as the output of the system. If the original data, however, was binary image data, the output data merger unit 130 supplies the edge enhanced sorted data received from the binary edge enhancement processor unit 120 as the output of the system.

An example of the operation of the system will be discussed with reference to FIGS. 52–54. FIG. 52 illustrates a 3×3 window of gray-scale image data supplied to the binarization and sorting unit 110. The binarization and sorting unit 110 passes only those pixel values that are indicative of binary image information, namely a value of fifteen for an exposed pixel or a value of zero for a non-exposed pixel for the illustrated example (assuming a four bit 0–15 gray-scale), to the binary edge enhancement processor unit 120. Those pixel locations containing gray-scale data are filled with zeros as illustrated in FIG. 53. The binary edge enhancement processor unit 120 then performs an edge enhancement processing operation on the data shown in FIG. 53. The output data merge unit 130 analyzes the original data illustrated in FIG. 52 to determine whether gray-scale information is present. A simple comparison operation, for example, can be used to compare each pixel value within the window to either zero or fifteen. If the pixel value does not fall within this criteria, as is the case for the data illustrated in FIG. 52, the output data merge unit 130 passes the original data to the output of the system, thereby avoiding any possible distortion of the gray-scale data. In the case where the original bitmap data is binary image data, for example as shown in FIG. 54, the sorted data supplied by the binarization and sorting unit 110 to the binary edge enhancement processor unit 120 will be identical to the original data. The output data merge unit 130 will then select the edge enhanced data produced by the binary edge enhancement processor unit 120 as the output of the system.

Figure 1:
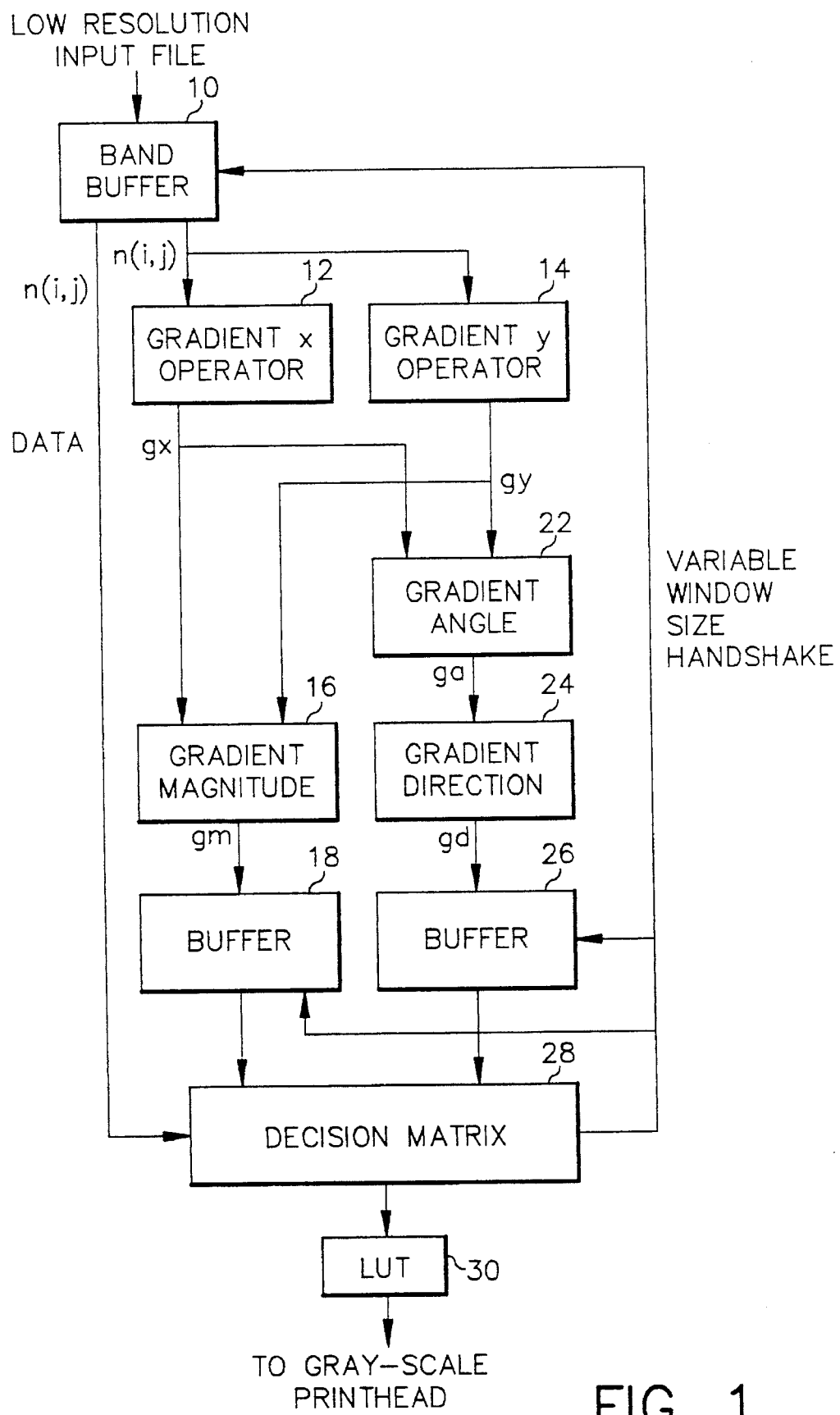
FIG. 1 is a functional block diagram of a binary data edge enhancement processor used in the edge enhancement processing system illustrated in FIG. 51.
Figure 2A:
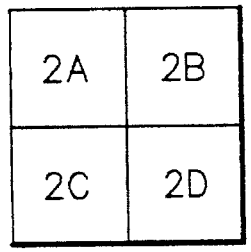

It will be understood that the binary edge enhancement processor unit 120 can be implemented with any of the previously discussed conventional binary image edge enhancement systems. A preferred edge enhancement processor to be used in the binary edge enhancement processor unit 120, however, is shown in FIG. 1. The edge enhancement processor stores the bitmap data received from the data sorter in a band buffer 10, where N(i,j) is a pixel value within the bitmap at location (i,j). An example of bitmap containing only binary image data is shown in FIG. 2, where an exposed pixel is indicated by the numeral 255 and non-exposed pixels are indicated by a zero. Sobel gradient masks 12, 14 for both the horizontal (sobelx) and vertical (sobely) directions operate on the binary bitmap data in order to produce a gradient x operator (gx) and a gradient y operator (gy). Typical Sobel gradient masks that can be employed include:

sobelx=(−1 0 1, −2 0 2, −1 0 1)

where $gx(i,j) = sobelx * n(i,j)$; and $$sobely = (-1\ -2\ -1,\ 0\ 0\ 0,\ 1\ 2\ 1)$$

where $gy(i,j) = sobely * n(i,j)$

The gradient magnitude (gm) 16 is then calculated by taking the square root of the sum of the square of the gradient x operator (gx) and the square of gradient y operator (gy) for each location in the bitmap to produce a gradient magnitude map, as shown in FIG. 3. The gradient magnitude map is then stored in a buffer 18 for later use.

$$gm(i,j) = sqrt(gx(i,j)2 + gy(i,j)2)$$

Similarly, the gradient angle (ga) 20 is determined for each location using the equation:

$$ga(i,j) = tan-1(gy(i,j)/gx(i,j))$$

to produce a gradient angle map 22 as shown in FIG. 4. It should be noted that an arctangent calculation can also be employed to calculate ga if desired.

For purposes of convenience, the gradient angle ga is preferably limited to a choice of gradient directions gd by a gradient direction sorter 24. For example, eight directions are preferably employed using the following sort criteria:

$gd=2$, if $(68° >= ga > 23°)$ $gd=3$, if $(113° >= ga > 68°)$ $gd=4$, if $(158° >= ga > 113°)$ $gd=5$, if $(203° >= ga > 158°)$ $gd=6$, if $(248° >= ga > 203°)$ $gd=7$, if $(293° >= ga > 248°)$ $gd=8$, if $(338° >= ga > 293°)$ $gd=1$, if ga is between 338 and 23 degrees and gm isn't zero $gd=0$, if $gm=0$ The gradient direction for each location is also stored in a buffer 26. It should be noted that the use of a finer separation criteria (i.e. more than eight directions) for gd can be employed if desired.

The original bitmap data and the gradient magnitudes gm and gradient directions gd corresponding thereto are supplied to a decision matrix 28, which uses this information to select edge enhanced gray-scale output data to replace the original binary bitmap data. In a preferred mode of operation, the decision matrix 28 determines whether the central pixel of a window of the original bitmap data is a black or white pixel, whether the central pixel is contained in a single pixel line and the position of the pixel with respect to a kink site, by comparing the pixel data to a predetermined pixel value and gradient magnitude templates. Once a template match is established, the decision matrix generates an address that is supplied to a look-up-table (LUT) 30. The LUT 30 generates edge enhanced gray-scale output data based on the address generated by the decision matrix 28. The enhanced grey scale output data replaces the original binary input data and produces a smoother image without jagged edges when applied to a gray-scale printhead (for example a laser, LED orthermal printhead) of a printer.

It should be noted that the illustrated edge enhancement processor can be implemented as computer program executed on a general purpose computer, in hardware as a pipelined processing system, preferably in the form of an application specific integrated circuit (ASIC), or a combination thereof. Processing speeds can be improved by pre-calculating the gradient magnitudes and directions for all possible combinations of binary data within the window and storing the precalculated values within gradient magnitude and gradient direction LUTs. In operation, a window of binary data is supplied as an address to the gradient magnitude and gradient direction LUTs which then generate corresponding gradient magnitude and directions maps. The operation of the decision matrix can similarly be implemented with LUTs by supplying the original binary input data and corresponding gradient magnitude and direction information as an address thereto.

Figure 5A:
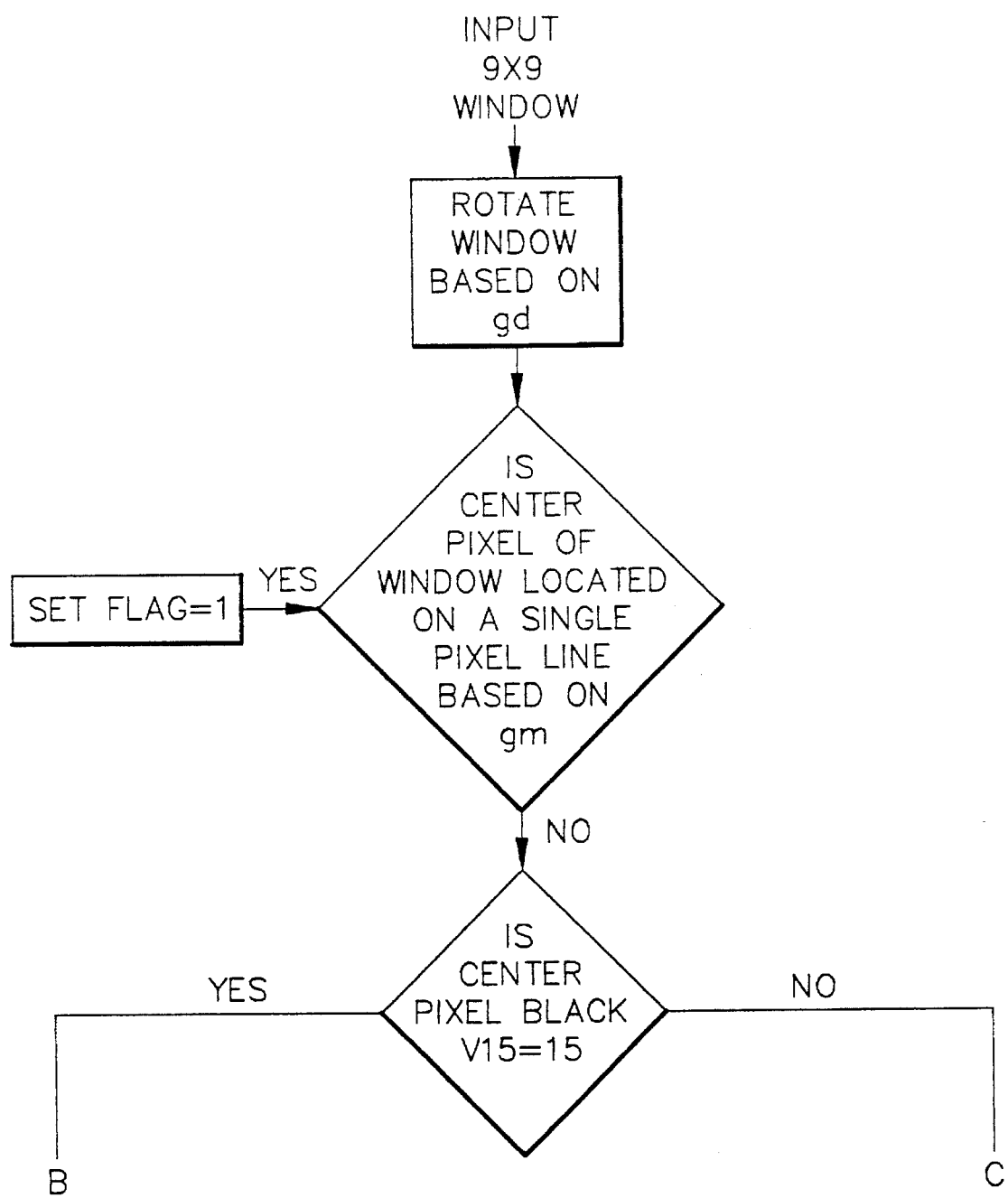
FIGS. 5A–5C form a functional flow diagram of the operation of the decision matrix employed in the binary data edge enhancement processor system shown in FIG. 1.
Figure 5B:
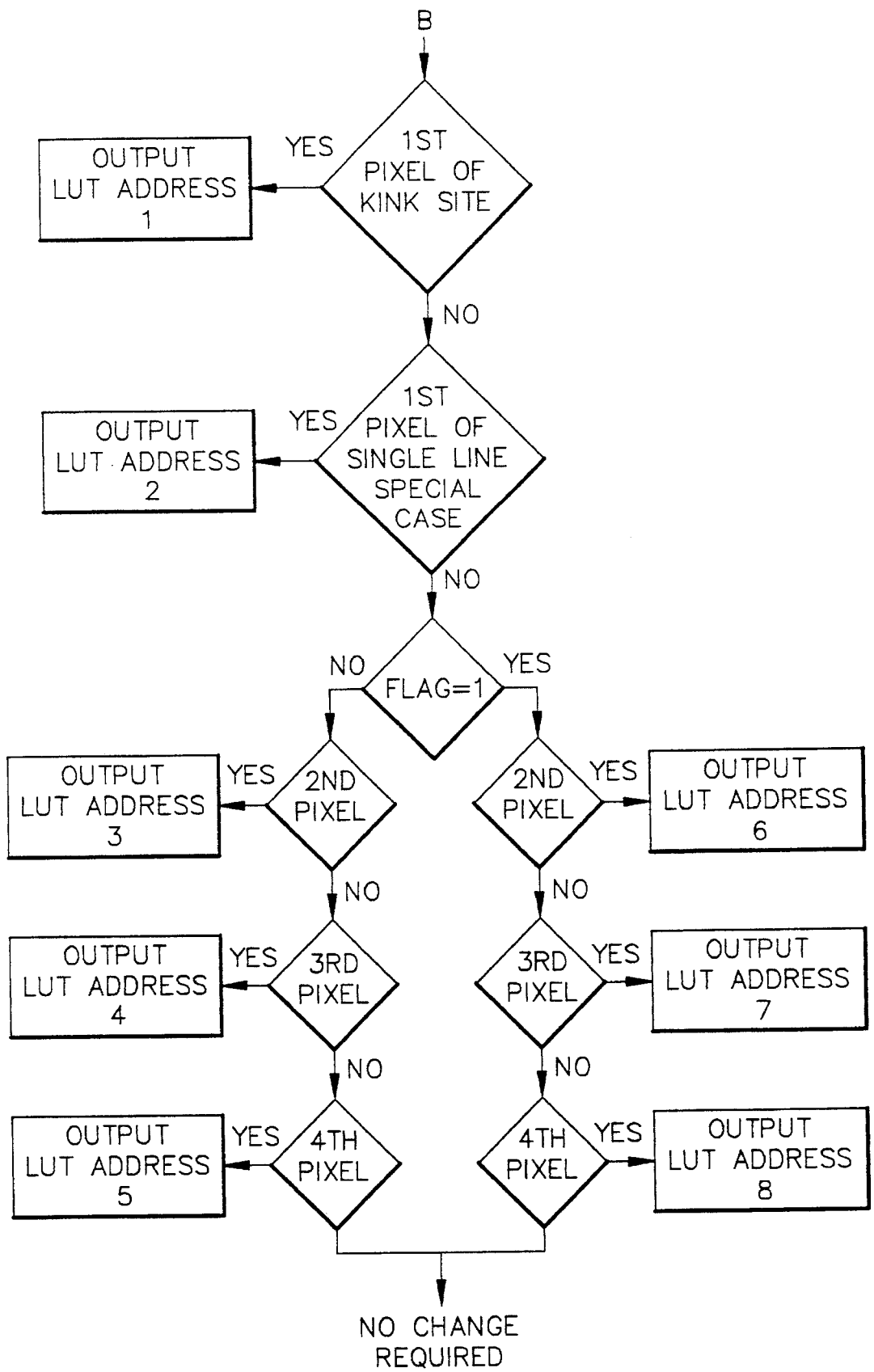
Figure 5C:
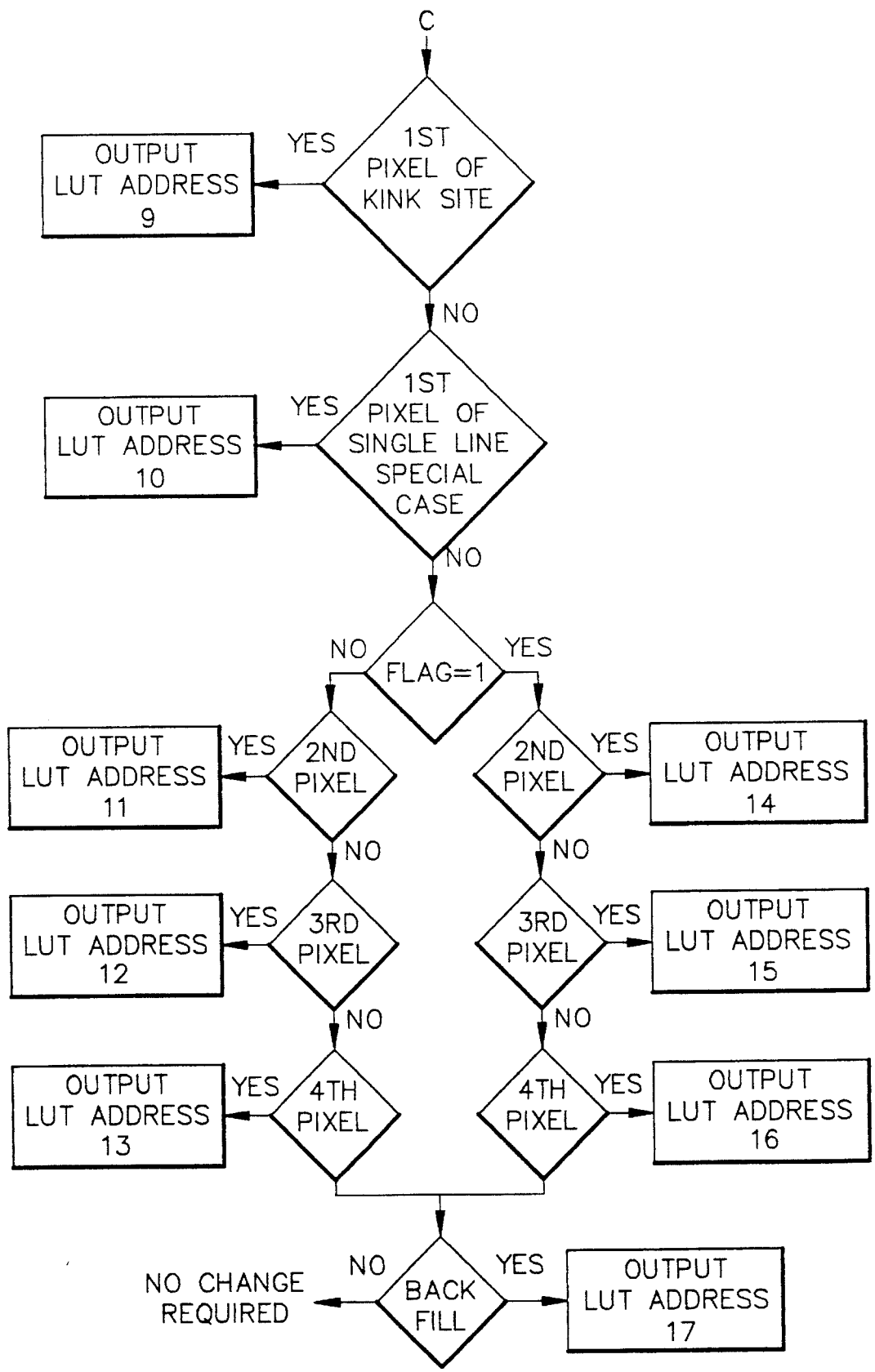

A general flow diagram of the operation of the decision matrix as implemented in software is illustrated by the decision tree shown in FIG. 5. FIG. 6 illustrates a 9×9 window of data retrieved from the original binary bitmap data previously stored in the band buffer which is applied to the decision tree. The pixel values illustrated in FIG. 6 are for a section of a near vertical line that is greater than one pixel in width. FIGS. 7 and 8 respectively illustrate the gradient directions and magnitudes corresponding to each of the pixel values illustrated in FIG. 6. In this example, exposed pixels are denoted by the numeral fifteen and non-exposed pixels are denoted by zero.

The decision matrix first orients the pixel data via a rotation operation in order to decrease the number of template matches that will be required to identify kink sites requiring edge correction. For example, a near vertical edge (see the circled second black pixel of a kink site shown in FIG. 6) can either be approached from the left (gd=1) or the right (gd=5), while a near horizontal line can be approached either from the top (gd =3) or the bottom (gd=7). An example of a near horizontal line segment shown in FIG. 9–11. In the case of the vertical line approached from the right, a 3×5 window of pixels surrounding the second black pixel of the kink site of the near vertical line, as shown in FIGS. 12–14, can be rotated to a position illustrated in FIGS. 15–17 based on the direction of the second black pixel. Similarly, a 3×5 window of pixels surrounding the second black pixel of the kink site of the near horizontal line as shown in FIGS. 9–11 can also be rotated to a position illustrated in FIGS. 18–20. As the pixel values are identical for the rotated segments as shown in FIGS. 15 and 18, a single template match can be used to identify kink sites in both near vertical lines approached from the right and the near horizontal lines approached from the top, and the same enhanced gray-scale data can therefore be employed to smooth the kink site in both cases. In fact, all of the near vertical and near horizontal lines (for all four possible directions of approach) can be sorted through the rotation operation into a template matching the configuration of FIGS. 15 and 18 or a template matching the configuration shown in FIG. 21, rather than the eight templates that would be required (two for each direction) if rotation were not employed. A similar procedure is done for near diagonal line segments (i.e. gd=2, 4, 6 or 8).

The rotation of the pixels within the windows is accomplished by a simple remapping routine. FIGS. 22–45 illustrate how the pixel values, gradient magnitudes and gradient directions correspond for each direction. For purposes of illustration, the pixel values for each pixel within the 9×9 window are denoted with a V(x y) nomenclature, where V is the pixel value, x is a row position within the 9×9 window and y is a pixel position within the row. For example, as shown in FIG. 22, the pixel value of the central pixel within the 9×9 window is denoted by V15. Similarly, the gradient direction and magnitude for each pixel within the window is respectively denoted by d(x y) and a(x y).

In addition to rotating the pixel window to a predetermined direction, the pixel value of the central pixel within the window is analyzed to determine whether the pixel is a black pixel or a white pixel, whether the central pixel is located within a single pixel line, and the location of the central pixel with respect to the kink site. Each of these factors can influence the type of enhanced data utilized to smooth the kink site. The determination of whether the pixel is black or white is made by a simple comparison of the pixel value to the value assigned to an exposed pixel. For example, in the embodiment just discussed, the central pixel is a black pixel if the pixel value is fifteen (V15=15) and the central pixel is a white pixel if the pixel value is zero (V15=0). The determination of whether the central pixel is located within a single pixel line is made by comparing the gradient direction of central pixel to the gradient directions of surrounding pixels. For example, for a horizontal single line illustrated in FIG. 46, the second black pixel from the kink site has a direction of zero, while the pixel location above the second black pixel has a direction of three and the pixel location below the second black pixel has a direction of seven as shown in FIG. 47. Similarly, the second black pixel from a kink site of a vertical single pixel line shown in FIG. 48 has a direction of zero, while the pixel location to the left has a direction of one and the pixel location to the right has a direction of five as shown in FIG. 49. The determination of the location of the pixel with respect to the kink site is based on the gradient magnitude of the pixel location and adjacent pixel locations. For example, the gradient magnitude will always be the highest value for the first pixel location of the kink site. Thus, the pixel values and gradient amplitudes can be compared with a template to determine whether the central pixel is the first, second, third or fourth pixel from the kink site. If desired, a backfill template can also be employed if the white pixel is not identified as the first through fourth pixel from the kink site.

As shown in FIG. 5, it is preferable to make the decision of whether the pixel is a white or black pixel and then proceed immediately with a determination of whether the pixel is the first pixel of a kink site, before making a determination of whether the pixel is the first pixel of a single line. If the pixel does not fall into one of these two categories, a general decision is made as to whether the pixel is in a single line. The determination of whether the pixel is the first pixel of a single line is made on a different criteria than the criteria used for the general decision in the subsequent step, in order to cover a special case where the first pixel of the kink site in a single line overlaps an adjacent pixel instead as shown in FIG. 55. If a criteria were used in which a change in direction were required from both sides of the pixel in order to identify a single pixel line, the case of the overlapped first pixel would not be caught.

The following are examples of typical template comparisons that are preferably applied to the pixel values and gradient magnitudes to determine whether the central pixel is:

a) the first black pixel of a kink site (not a single pixel line) if: a15>a14 & a15>a16 & V35≠0 & V25=0 & V26=0 & V45=0 & V36≠0 & V55≠0 & ((V24 ≠0 V16=0 V14≠0) or (V27≠0 V14=0 & V16≠0));

b) the first black pixel of a kink site in a single pixel line if: (V15≠0 & (V14≠0 & V13≠0 & V16=0 & V17=0 & ((V26≠0 & V27≠0 & V24=0 V23=0) or (V36≠0 & V37≠0 & V34=0 & V33=0))) or (V16≠0 & V17≠0 & V13=0 V14=0 & ((V23≠0 & V24≠0 & V26=0 & V27=0) or (V33≠0 & V34≠0& V36=0 & V37=0)))); and c) the first white pixel of a kink site in a single pixel line if: (V15=0 & V35≠0 & ((V13=0 & V14=0 & V16≠0 & V17≠0 & V34≠0) or (V13≠0 & V14≠0 & V16=0 & V17=0 & V36≠0) & ((a15>a14 & <=a16) or (a15<=a14 & a15>a16))).

Similar criteria are used for each of the other decisions illustrated in FIG. 5. Once a match is established, an address is generated and supplied to the LUT in order to generate corresponding enhanced gray-scale data which is subsequently supplied to the grey scale print head of a printer. See, for example, the enhanced gray-scale data shown in FIG. 50 which corresponds to the original data shown in FIG. 12. The actual values of the enhanced gray-scale data to be utilized in place of the binary input data depends on the characteristics of the printer to which the enhanced data is to be supplied and on a subjective determination of what is considered acceptable to the end viewers of the printed images. The original binary bitmap data is used if no match occurs.

Some basic rules, however, do apply in generating the enhanced data to be stored in the LUT. For example, looking at some kink sites in the down stroke of the letter R in the gradient magnitude map of FIG. 3 and the gradient angle map of FIG. 4, it is noted that the gradient magnitude is at a peak value right at the kink site with respect to the gradient magnitude of the pixels along the gradient direction (the gradient direction being along the tangential direction of the line). Thus, for an exposed pixel, it is desirable to reduce the exposure at that kink site to reduce jaggedness. In contrast, it is desirable to increase the exposure of the white pixel at the kink site, which also has the gradient magnitude at its peak, to reduce line jaggedness, provided that one of the pixel values along the gradient direction is not zero which signifies that the white kink site is indeed a kink site. Similar sets of rules can be written to take care of black or white pixels at a certain distance to the kink site to have a gradual line width change to reduce tangential gradient magnitude changes. It should be noted that the exposure value of the exposed and non-exposed pixels is not changed on the upper portion of the letter R, since no kink site is defined (gradient change along the gradient direction of search turns out a similar gradient magnitude). Therefore the normal gradient magnitude or sharpness of the letter is not reduced. Other rules can be written to take care of single pixels.

The system preferably makes use of a variable window depending on the gradient angle (or direction) change of the pixels along the gradient angle. For example, the problem of line jaggedness usually occurs at near horizontal and near vertical lines. For the case of a near horizontal line, a larger window (preferably rectangular with a long axis in the direction of the line segment) along the direction of the gradient direction can be utilized. If the gradient direction of the pixels is not changing much, a longer window (with a certain limit beyond which the visual sensitivity curve won't matter for the observer) is used. For 400 dpi, about 20 pixels in a window in one direction is about right or 10 pixels from the original position on both sides. Then if a kink site is hit, usually signifying a large change in gradient magnitude and direction—like from an angle of 180 to 153 degree change in a near vertical case—, the current pixel location with respect to the kink site will give the LUT necessary information for the modification.

The invention has been described with reference to certain preferred embodiments thereof. It will be understood, however, that modifications and variations can be made within the scope of the appended claims.

INDUSTRIAL UTILITY

The invention can be utilized to process mixed image data files for printing on any type of gray-scale printer including those employing lasers, LEDs or thermal printing elements.

What is claimed is:

1. An image processing system comprising:

means for operating upon a mixture of inputted image data including first binary image data and first gray-scale image data and generating second binary image data wherein the second binary image data is comprised of a mixture of the first binary image data and third binary image data representing the first gray-scale image data converted to binary image data;

means for performing edge enhancement on the second binary image data to produce gray-scale enhanced binary image data wherein the gray-scale enhanced binary image data includes a mixture of binary image data and second gray-scale image data, said gray-scale enhanced binary image data having a pixel-wise correspondence to the inputted image data;

means for selectively merging and outputting the inputted image data and the gray-scale enhanced binary image data as outputted image data, the outputted image data including:

the gray-scale enhanced binary image data selected as output by said means for selectively merging and outputting if the gray-scale enhanced binary image data pixel-wise corresponds to the first binary image data in the inputted image data; and the inputted image data selected as output by said means for selectively merging and outputting if the inputted image data pixel-wise corresponds to the first gray-scale image data.

2. An image processing system as claimed in claim 1, wherein said means for performing edge enhancement comprises means for storing a bitmap image file including a plurality of pixel locations of the second binary image data; means for determining a gradient magnitude corresponding to each pixel location of the bitmap image file; means for determining a gradient direction corresponding to each pixel location of the bitmap image file; decision matrix means for comparing data representing a window of pixels in the bitmap image file and the gradient magnitude and gradient direction corresponding thereto to predetermined criteria and generating a signal if a match occurs; and memory means for generating the gray-scale enhanced binary image data in response to the signal.

3. A system as claimed in claim 2, wherein the decision matrix means includes means for rotating the data representing a window of pixels to a predetermined reference direction in response to the gradient direction information corresponding thereto.

4. A system as claimed in claim 2, wherein the decision matrix means determines whether a pixel of the data representing a window of pixels is a black or white pixel, whether the central pixel is located in a single pixel width line, and a location of the pixel with respect to a kink site.

5. An image processing method comprising the steps of: operating upon a mixture of inputted image data including first binary image data and first gray-scale image data and generating second binary image data wherein the second binary image data is comprised of a mixture of the first binary image data and third binary image data representing the first gray-scale image data converted to binary image data; performing an edge enhancement operation on the second binary image data to produce gray-scale enhanced binary image data wherein the gray-scale enhanced binary image data includes a mixture of binary image data and second gray-scale image data, said gray-scale enhanced binary image data having a pixel-wise correspondence to the inputted image data; selectively merging and outputting the inputted image data and the gray-scale enhanced binary image data as outputted image data, the outputted image data including:

the gray-scale enhanced binary image data selected as output in the step of selectively merging and outputting if the gray-scale enhanced binary image data pixel-wise corresponds to the first binary image data in the inputted image data; and the inputted image data selected as output in the step of selectively merging and outputting if the inputted image data pixel-wise corresponds to the first gray-scale image data.

6. An image processing method as claimed in claim 5, wherein the step for performing edge enhancement comprises storing a bitmap image file including a plurality of pixel locations of the second binary image data; determining a gradient magnitude corresponding to each pixel location of the bitmap image file; determining a gradient direction corresponding to each pixel location of the bitmap image file; comparing data representing a window of pixels in the bitmap image file and the gradient magnitudes and gradient directions corresponding thereto to predetermined criteria and generating a signal if a match occurs; and generating the gray-scale enhanced binary image data in response to the signal.

7. An image processing method as claimed in claim 6 and including the step of rotating the data representing a window of pixels to a predetermined reference direction in response to the gradient direction information corresponding thereto.

8. An image processing method as claimed in claim 6 and including the step of determining whether a pixel of the data representing a window of pixels is a black or white pixel, whether the pixel is located in a single pixel width line, and a location of the pixel with respect to a kink site.

* * * * *